Figure 1:
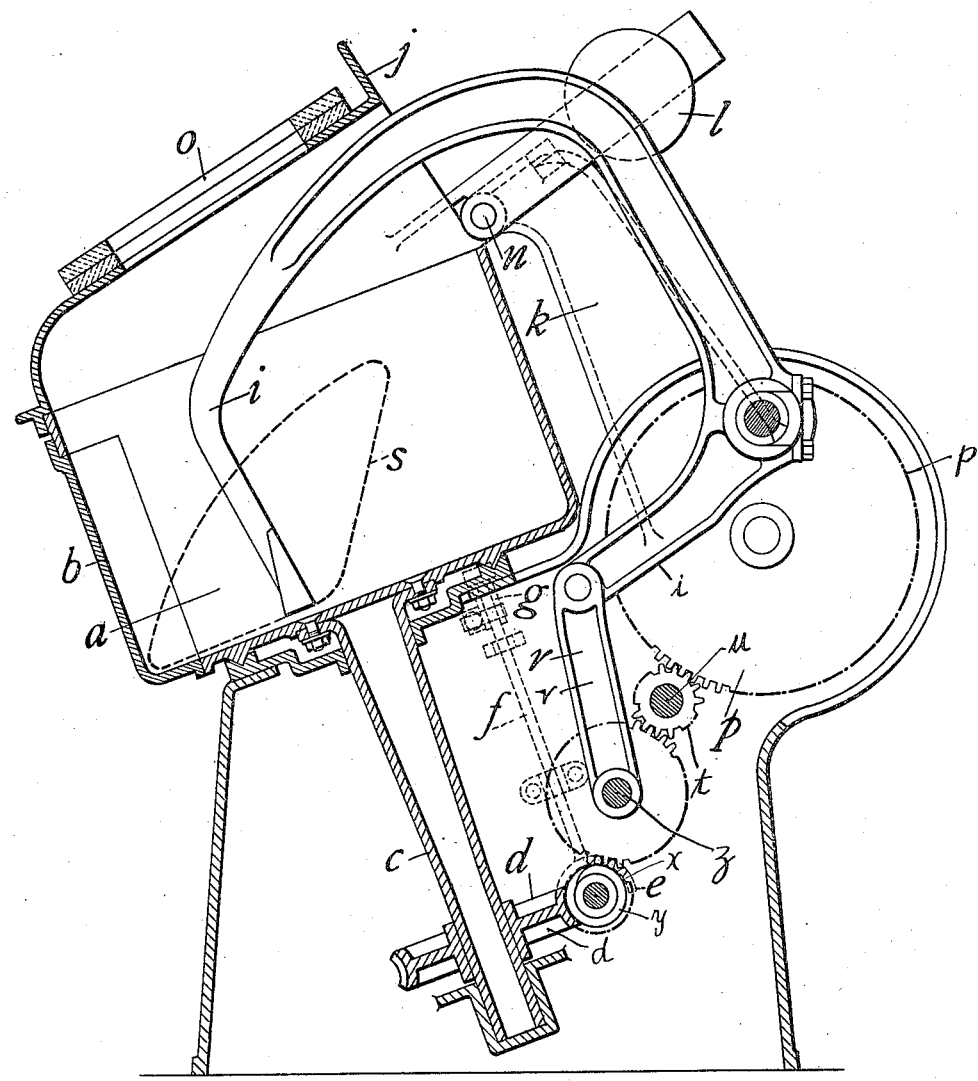

C. E. & J. E. POINTON.
DOUGH KNEADING OR MIXING MACHINERY.
APPLICATION FILED AUG. 3, 1908.

934,834.

Patented Sept. 21, 1909.
2 SHEETS—SHEET 1.

WITNESSES:

INVENTORS

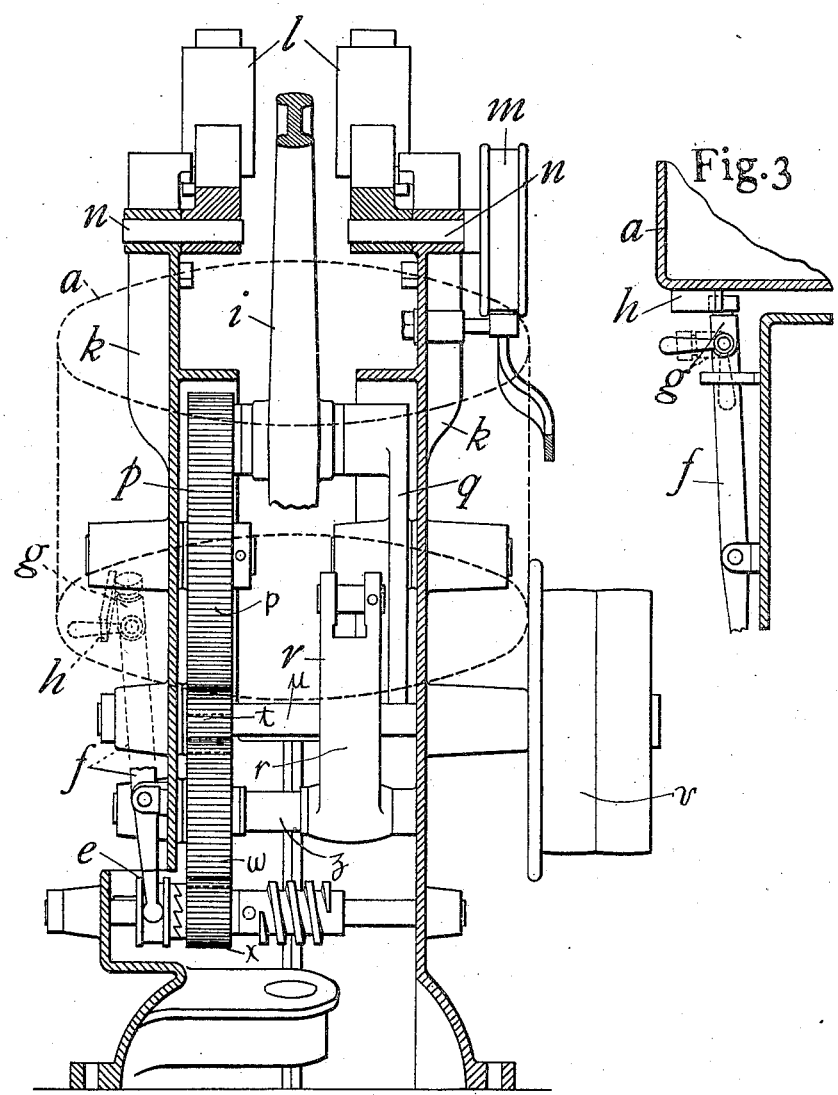

UNITED STATES PATENT OFFICE.

CHARLES EDWARD POINTON AND JOHN EDWARD POINTON, OF PETERBOROUGH, ENGLAND.

DOUGH KNEADING OR MIXING MACHINERY.

934,834.  Specification of Letters Patent.  Patented Sept. 21, 1909.

Application filed August 3, 1908. Serial No. 446,701.

*To all whom it may concern:*

Be it known that we, CHARLES EDWARD POINTON and JOHN EDWARD POINTON, subjects of Great Britain, residing at Westwood Works, Peterborough, in the county of Northampton, England, have invented new and useful Improvements Relating to Dough Kneading or Mixing Machinery, of which the following is a specification.

This invention relates to machines for the kneading or mixing of dough, for bread making or other purposes, of the type in which there is provided a rotating trough or like receptacle for the material and a kneading or mixing arm arranged for operation within the said trough.

Referring to the two accompanying sheets of explanatory drawings:—Figure 1 is a sectional side elevation and Fig. 2 a sectional front elevation illustrating the general arrangement of a dough kneading or mixing machine constructed in accordance with this invention. Fig. 3 is a small sectional view showing the action of the automatic stop device.

The same reference letters in the different views indicate the same parts.

The dough trough or receptacle $a$ is mounted in a tilted or inclined position to facilitate the withdrawal of the dough after kneading or mixing. When no lid or cover is required the upper portion of the trough $a$ is preferably tapered inwardly or toward its center in order to prevent the material from flowing over the rim during the kneading or mixing operation. A hinged or sliding door $b$ is provided for the trough, or a segment extending the full length or depth of the latter may be hinged or otherwise connected to the main portion to afford a clear opening when desired for the withdrawal of the mixed material. The trough is preferably supported by a hollow stem or post $c$ arranged at the same inclination as that of the trough itself and mounted in bearings in the framing of the machine. The worm wheel $d$ for the rotation of the trough can be secured upon the said stem or post.

To enable the trough $a$ to be readily stopped whenever desired, with the aforesaid door or opening segment at the front side of the machine, or in position for discharge of the mixed material, a clutch $e$ and a lever $f$ or their equivalent are arranged in conjunction with the rotating gear. At the upper end of the lever $f$ or other clutch operating element is mounted a tappet piece $g$ adapted to be placed in the path of a suitable stop or abutment piece as $h$ formed on the bottom of the trough. For stopping the trough for discharge of its contents it is thus only necessary to move the tappet piece of the lever or like part into position as aforesaid, for the stop or abutment piece referred to is so placed that when by its abutment against the said tappet the lever is operated for disconnection of the gear, the trough will be brought to rest with its door in position for the discharge or withdrawal of the mixed material. On opening the door the said discharge will be effected automatically due to the inclination of the trough and the effect of the kneading arm $i$ or like element which can continue to operate within the trough.

A non-rotatable lid or cover $j$ is ordinarily hingedly mounted above the open top of the trough. The said lid or cover is carried by a bracket like part $k$ projecting above the framing of the machine, and it is by preference so counter-balanced by weights $l$ that it will remain in any position in which it might be placed. For securing the lid in the required position we provide a friction brake $m$ in conjunction with one of the hinge pins $n$ or its equivalent, or we may employ any other convenient means. An aperture $o$ may be provided in the lid or cover for the introduction of flour, or for inspection during the mixing operation.

The whole of the gearing for the rotation of the trough $a$ and also for the operation of the kneading or mixing arm $i$ or its equivalent, is arranged within the one self-contained framing or standard of the machine supporting as shown the trough and its lid or cover as aforesaid. The said gearing and allied rotating parts are thus very effectually guarded. The arm itself is pivotally mounted between the gear wheel $p$ and balanced disk $q$ and is connected at one end to an oscillatory link $r$, the arrangement being such that the path described by the operative end of the arm in the trough is approximately such as is indicated by the dotted lines $s$ (Fig. 1). Motion of the arm $i$ is obtained from the driving pinion $t$ on the shaft $u$ of the belt pulleys $v$, which pinion gears with the wheel $p$. Motion of the worm wheel $d$ is obtained from the same pinion $t$ through pinions $w$ and $x$ and worm wheel $y$. The arm $r$ is mounted on the shaft $z$ of the pinion $w$.

Having thus described our invention, what we claim as new and desire to secure by Letters Patent is:—

1. In dough kneading or mixing machines, the combination consisting of an inclined rotatable trough, a discharge door forming part of said trough, an inclined stem rotatable with and supporting the trough, trough rotating gear consisting in part of a worm wheel secured upon the said stem, and means for automatically stopping the trough with the said door at a predetermined position, as set forth.

2. In dough kneading or mixing machines, the combination consisting of an inclined rotatable trough, a discharge door forming part of said trough, an inclined stem rotatable with and supporting the trough, trough rotating gear consisting in part of a worm wheel secured upon the said stem, a kneading arm, kneading arm operating gear, and means for automatically stopping the trough with the said door at a predetermined position and while the operation of the kneading arm continues, as set forth.

3. In dough kneading or mixing machines, the combination consisting of a rotatable trough, a discharge door forming part of the said trough, trough rotating gear, a clutch whereby the said gear is put in or out of action, a lever for imparting movement to the said clutch, an abutment piece on the trough, and a tappet piece on the lever movable into the path of the said abutment piece for engagement thereby, as set forth.

In testimony whereof we have signed our names to this specification in the presence of two subscribing witnesses.

CHARLES EDWARD POINTON.
JOHN EDWARD POINTON.

Witnesses:
   ALBERT E. PARKER,
   PERCY A. OUTHWAITE.